US011202981B2

(12) United States Patent
Fenske et al.

(10) Patent No.: US 11,202,981 B2
(45) Date of Patent: *Dec. 21, 2021

(54) DEVICE FOR SEPARATING PARTICLES FROM A GAS FLOW, PARTICLE SEPARATOR AND CRANKCASE VENTILATION SYSTEM

(71) Applicant: WOCO Industrietechnik GmbH, Bad Soden-Salmünster (DE)

(72) Inventors: Sebastian Fenske, Gelnhausen (DE); Marcus Rüttger, Steinau an der Straβe (DE); Martin Klingelhöfer, Hanau (DE)

(73) Assignee: Woco Industrietechnik GmbH, Bad Soden-Salmunster (DE)

( * ) Notice: Subject to any disclaimer, the term of this patent is extended or adjusted under 35 U.S.C. 154(b) by 58 days.

This patent is subject to a terminal disclaimer.

(21) Appl. No.: 16/593,365

(22) Filed: Oct. 4, 2019

(65) Prior Publication Data
US 2020/0108340 A1  Apr. 9, 2020

(30) Foreign Application Priority Data
Oct. 5, 2018  (DE) .......................... 102018124654.4

(51) Int. Cl.
*B01D 45/00*  (2006.01)
*B01D 45/16*  (2006.01)
(Continued)

(52) U.S. Cl.
CPC ............. *B01D 45/16* (2013.01); *B01D 45/08* (2013.01); *B01D 45/12* (2013.01); *F01M 13/04* (2013.01);
(Continued)

(58) Field of Classification Search
CPC ...... B01D 45/16; B01D 45/12; B01D 50/002; B01D 45/08; F01M 13/04;
(Continued)

(56) References Cited

U.S. PATENT DOCUMENTS 2,952,330 A * 9/1960 Winslow ................ B01D 45/12
96/212
4,309,969 A * 1/1982 Matthes .................... F01L 3/06
123/188.7
(Continued)

FOREIGN PATENT DOCUMENTS

DE  10 2004 049 089 A1  4/2006
DE  20 2005 009 990 U1  11/2006
(Continued)

OTHER PUBLICATIONS

Office Action dated Sep. 25, 2019 for German Patent Application No. 10 2018 124 647.1 (German language only) (14 pp.).

*Primary Examiner* — Dung H Bui
(74) *Attorney, Agent, or Firm* — Crowell & Moring LLP

(57) ABSTRACT

A device separates particles, such as oil particles, from a gas flow, from a blow-by gas of a crankcase ventilation, in an internal combustion engine. The device includes a valve seat, which defines at least one flow passage opening and through which the gas flow at least partially flows in a main flow direction, and a movable valve element, which can be adjusted relative to the valve seat such that flow guide surfaces of the valve seat and the valve element deflect the gas flow in such a way that particles separate from the gas flow due to the impact of the particles on the flow guide surfaces. At least one flow guide surface of the valve seat or the valve element has at least one turbine blade-like guide projection or at least one turbine blade-like guide depression in order to transform the gas flow into a swirling flow.

14 Claims, 5 Drawing Sheets

(51) Int. Cl.
*F01M 13/04* (2006.01)
*B01D 45/08* (2006.01)
*B01D 45/12* (2006.01)
*B01D 50/00* (2006.01)

(52) U.S. Cl.
CPC ... *B01D 50/002* (2013.01); *F01M 2013/0422* (2013.01)

(58) Field of Classification Search
CPC ... F01M 2013/0422; F01M 2013/0016; F01M 13/0011; F01M 2013/0433; F01M 2013/0427
See application file for complete search history.

(56) References Cited

U.S. PATENT DOCUMENTS

| | | | | |
|---|---|---|---|---|
| 4,389,988 A | * | 6/1983 | Ong | F02B 31/04 123/306 |
| 5,785,254 A | * | 7/1998 | Zimmermann | F02M 61/162 239/490 |
| 6,260,530 B1 | * | 7/2001 | Keon, Jr. | F01L 3/06 123/188.8 |
| 6,797,040 B2 | * | 9/2004 | Lenzing | B01D 45/06 55/462 |
| 7,799,567 B1 | * | 9/2010 | Call | B07B 7/00 436/53 |
| 7,964,009 B2 | * | 6/2011 | Herman | F01M 13/04 55/418 |
| 2002/0073704 A1 | * | 6/2002 | DiMarco | F02B 31/06 60/599 |
| 2006/0112941 A1 | * | 6/2006 | Hilpert | B04C 5/28 123/573 |
| 2009/0199826 A1 | * | 8/2009 | Meinig | B01D 45/08 123/573 |
| 2014/0157737 A1 | * | 6/2014 | Schleiden | F01M 13/04 55/464 |
| 2015/0275720 A1 | * | 10/2015 | Ruppel | B01D 46/003 55/312 |
| 2015/0292460 A1 | * | 10/2015 | Kobayashi | B05B 1/26 239/584 |
| 2016/0138442 A1 | * | 5/2016 | An | F01M 13/021 123/559.1 |
| 2016/0245137 A1 | * | 8/2016 | Hashimoto | B01D 45/16 |
| 2017/0145879 A1 | * | 5/2017 | Ratajczack | B01D 45/08 |
| 2017/0314432 A1 | * | 11/2017 | Dwivedi | F02M 25/06 |
| 2018/0038506 A1 | * | 2/2018 | Brulin | F16K 31/34 |

FOREIGN PATENT DOCUMENTS

| | | |
|---|---|---|
| DE | 10 2008 044 857 A1 | 8/2010 |
| DE | 20 2010 001 191 U1 | 6/2011 |
| DE | 10 2010 029 322 A1 | 12/2011 |
| DE | 20 2016 104 363 U1 | 12/2017 |
| DE | 10 2017 119 833 A1 | 2/2019 |
| WO | WO 2011/089006 A1 | 7/2011 |
| WO | WO 2016/184768 A1 | 11/2016 |

* cited by examiner

DEVICE FOR SEPARATING PARTICLES FROM A GAS FLOW, PARTICLE SEPARATOR AND CRANKCASE VENTILATION SYSTEM

RELATED APPLICATION

This application claims the benefit and priority of German Patent Application DE 10 2018 124 654.4, filed Oct. 5, 2018, which is incorporated by reference herein in its entirety.

TECHNICAL FIELD

The present invention relates to a device for separating particles, such as oil particles, from a gas flow, from a blow-by gas of a crankcase ventilation, in an internal combustion engine. Further, a particle separator may have at least two corresponding devices for separating particles from a gas flow, from a blow-by gas of a crankcase ventilation, in an internal combustion engine. There may also be a crankcase ventilation system of an internal combustion engine.

BACKGROUND

Separators, particularly oil separators, are generally known from the prior art. There generally exist two types of separators, namely active separators and passive separators. Active separators are characterized in that additional energy is expended for acting upon the particles, particularly oil particles, in order to achieve a higher separation efficiency. In a known electric separation system, for example, particles are electrically charged such that they are attracted by an antipolar surface and subsequently can be separated. In passive separators, no additional energy is introduced into the system. For example, passive separators utilize the kinetic energy of the gas flow. In this case, the particles are conveyed, for example, through a labyrinth or a cyclone such that they can be separated from the gas flow due to their mass inertia, wherein the particles can thereby be removed from the gas flow, which is subsequently cleaned. In oil separators, the oil particles particularly are returned into the oil circuit and the cleaned gas flow is returned into the intake air of the internal combustion engine.

A device for separating particles from a gas flow is known, for example, from WO 2016/184768. The gas flow impinges upon the separator on an underside that defines the flow inlet. The flow inlet leads into a flow channel that is defined by a flow guide element forming the underside of the separator, as well as a valve element that can be moved relative to the flow guide element and protrudes into the flow inlet. In this case, the flow guide element and the valve element are dimensioned and arranged relative to one another in such a way that the gas flow is deflected while it passes through the flow channel in order to enhance the separation rate, i.e. to increase the efficiency of the separator. Due to the increasingly strict legal and environmentally relevant regulations and requirements with respect to the separation rate and the associated efficiency of the separator, however, the oil separator described in this publication is reaching its limits.

SUMMARY

The present invention is based on the objective of rectifying the disadvantages of the prior art, particularly by making available a separator for separating particles from a gas flow, a particle separator and a crankcase with an improved separation rate.

Accordingly, a device for separating particles such as oil particles from a gas flow, such as from a blow-by gas of a crankcase ventilation, in an internal combustion engine is proposed. An inventive device for separating particles is also simply referred to as separating device below. The term oil separator or oil separating device would be appropriate for the specific use in the separation of oil particles. In an exemplary application of an inventive separator in a motor vehicle with an internal combustion engine, blow-by gases occurring between a working piston and a cylinder, in which the working piston is accommodated, accumulate in a crankcase interior of the internal combustion engine. So-called blow-by gases alternatively also occur between the cylinder and the cylinder head and/or between the cylinder head and a cylinder head cover of an internal combustion engine, e.g. a reciprocating piston engine. Blow-by gases typically not only contain air and oil, but also combustion gases and unburnt fuel components that may have negative effects on the function of the internal combustion engine. For example, the pressure increase in the crankcase caused by the blow-by gas flow is reduced or prevented, by means of a crankcase ventilation that is coupled to the fresh air supply of the internal combustion engine by means of a pipe system. An inventive separating device may be arranged, for example, within the crankcase ventilation along the flow direction, particularly in such a way that the blow-by gas flow containing the combustion gases and/or unburnt fuel components is fed to the separating device, in which a separation, particularly oil separation, of particles such as oil particles takes place, wherein the separated particles can thereby be discharged separately of the gas flow and the cleaned gas flow can be fed to the fresh air supply without damages to the internal combustion engine. The inventive separating devices are passive separating devices, in which no additional energy is introduced into the separating system as already described above.

The inventive separating device comprises a valve seat that defines a flow passage opening. The gas flow can at least partially flow through the at least one flow passage opening in a main flow direction, in order to be subjected to a particle separation by means of the separating device. The valve seat may interact with a valve element in order to close and/or open a flow passage opening and to thereby prevent and/or ensure a gas flow through the at least one flow passage opening. In this case, the valve seat has to be arranged relative to the gas flow in such a way that the gas flow can at least partially flow through the flow passage opening. The separating device defines a separation space, which is respectively located downstream of the valve element or the flow passage opening and into which the gas flow can flow through the flow passage opening. For example, a side of the valve seat facing the gas flow may have the shape of a planar plate. The flow passage opening can extend through the valve seat continuously from the side that faces the gas flow to a side that faces away from the gas flow and faces the separation space. For example, the flow passage opening has an angular, oval, round shape, or a circular shape.

The inventive separating device comprises a movable valve element that can be adjusted relative to the valve seat, with respect to its position relative to the valve seat in an axial actuating direction, in such a way that flow guide surfaces of the valve seat and/or the valve element deflect the gas flow and the particles thereby separate from the gas flow due to the impact of the particles on the flow guide surfaces. The term flow guide surfaces refers to the surfaces of the valve seat and the valve element, which can come in contact with the gas flow and can deflect and/or guide the gas flow. It was determined that the separation effect/the separation rate/the separation efficiency of the separating device significantly increases at an increasingly inclined orientation of a flow guide surface relative to the main flow direction of the gas flow, i.e. a maximal incline of 90°. However, increasing angles of inclination of the flow guide surfaces relative to the main flow direction result in a higher dynamic pressure, which has negative effects on the operation of the separating device. The term dynamic pressure generally refers to the increase of the fluid pressure relative to the static pressure of the gas flow at the stagnation point of a body being impinged upon, i.e. at the point, at which the gas flow impinges upon the respective flow guide surface. The valve element may be displaceable between a closed position, in which the valve element is in abutting contact with the valve seat, and at least one open position, in which the valve element is released from the abutting contact and moved in an axial actuating direction. The abutting contact may define an axial abutting point, wherein the term axial should be interpreted with respect to the axial actuating direction. When the valve element moves from an open position into the closed position, i.e. into the abutting contact with the valve seat that is defined by the axial abutting point, the valve element can carry out an axial motion in an axial closing direction that extends opposite to the axial actuating direction. This closing direction essentially extends parallel and opposite to the axial actuating direction, wherein the axial actuating direction and the axial closing direction may generally be referred to as axial direction, but with opposite orientation. The term open position particularly refers to the position of the valve element relative to the valve seat, in which the valve element and the valve seat are not in abutting contact, i.e. in which the valve element is not located at the abutting point.

According to an embodiment, at least one flow guide surface of the valve seat and/or the valve element has at least one turbine blade-like guide projection and/or at least one turbine blade-like guide depression in order to transform the gas flow into a swirling flow. The guide projection and/or the guide depression may be arranged in such a way that a high separation effect is achieved, wherein the occurring dynamic pressure is kept as low as possible. In this case, an inflow edge of the guide projection and/or the guide depression, which initially comes in contact with the gas flow, may be oriented in such a way that an angle of inclination of the inflow edge relative to the main flow direction of the gas flow is as small as possible and increases continuously along the extent of the guide projection and/or guide depression, particularly up to an inflow profile rear edge, at which the gas flow loses contact with the guide depression and/or the guide projection.

In an exemplary embodiment of the inventive separating device, the at least one guide projection and/or the at least one guide depression has a helical shape. The guide projection and/or the guide depression therefore may coil about the main flow direction of the gas flow along the flow guide surfaces with a constant pitch. For example, a coil radius may decrease along the guide projection or the guide depression. In an embodiment, an angular extent of the at least one guide projection and/or the at least one guide depression may amount to at least 30°, including at least 45°, 60°, 75° or at least 90°. In this context, the angular extent may be defined as the angle between the inflow edge of the guide depression and/or the guide projection and the inflow profile rear edge relative to a reference point, wherein the reference point particularly may represent the center point of the helical extent of the guide depression and/or the guide projection and therefore define a coil radius.

In another exemplary embodiment of the present inventive separating device, a three-dimensional acceleration component, particularly an angular acceleration component, especially along the helical shape, an axial acceleration component in the main flow direction and/or a radial acceleration component in a direction, such as a radial direction, extending perpendicular to the main flow direction is imparted upon the gas flow while it flows along the at least one guide projection and/or the at least one guide depression. The resulting acceleration components, which cause an acceleration of the gas flow along the flow guide surfaces, enhance the efficiency of the particle separation.

According to an exemplary embodiment, a separation time for separating the particles from the gas flow by flowing along the at least one guide projection and/or the at least one guide depression is prolonged by at least 10%, including at least 15%, 20%, 25% or at least 30%. The separation time may be defined as the time period, in which the gas flow is subjected to a particle separation by the inventive separating device, the time period, in which the gas flow is in contact with flow guide surfaces of the valve element and/or the valve seat and/or in which the gas flow is located in a separation space defined by the separating device, wherein it has to be taken into account, in particular, that a separation effect can also be achieved when the gas flow exits the separating device, e.g. by arranging at least one guide projection and/or at least one guide depression in the outlet region. According to the invention, the prolonged separation time is related to the fact that the gas flow is deflected from its main flow direction and, in particular, follows an extended detour within the separating device such that a flow path of the gas flow within the separating device is extended, which consequently leads to a prolonged separation time. It basically has to be taken into account that the separation rate of the inventive separating device increases proportionally with the separation time.

In another exemplary embodiment of the inventive separating device, the at least one guide projection and/or the at least one guide depression comprises an inflow profile lug, on which the gas flow is introduced into the guide projection and/or the guide depression, and an inflow profile rear edge, on which the gas flow once again exits the guide projection and/or the guide depression. An imaginary and straight connecting line between the inflow profile lug and the inflow profile rear edge defines a profile chord, which is oriented askew with respect to the main flow direction. The profile chord, i.e. the imaginary connecting line between the inflow profile lug and the inflow profile rear edge, accordingly does not intersect the main flow direction and is also not arranged parallel thereto. This results of the inventive coiling of the gas flow about the main flow direction in order to extend the flow path on the guide projection and/or the guide depression.

According to an exemplary embodiment of the inventive separating device, the gas flow is deflected by a web that at least partially extends around the at least one flow passage opening. This measure particularly enhances the separation effect of the inventive separating device. In this case, the web can deflect the gas flow in such a way that particles separate from the gas flow due to the impact of the particles on a flow guide surface of the web. For example, the web may be realized in the form of a wall that extends in the main flow direction, wherein the axial extent of said wall is significantly greater than the wall thickness of the web. The web extends around the at least one flow passage opening, for example, in an annular manner. The web does not necessarily have to extend around the entire flow passage opening, i.e. it does not have to be completely closed. For example, the web may be open, i.e. have an axial gap, in at least one location in the circumferential direction. It is conceivable to dimension the axial gap in such a way that it causes a separation effect with respect to the passing gas flow due to the impact on edges of the web and/or due to the cross-sectional taper acting upon the gas flow. It would be possible, for example, to provide multiple axial gaps that are uniformly distributed with respect to the flow passage opening in the circumferential direction.

According to an embodiment, the web may comprise an edge that faces the valve element, wherein the separated particles can drip off on said edge. The thusly formed drip edge accordingly promotes the separation effect of the inventive separating device. The defined dripping furthermore makes it possible to realize a purposeful separation of the gas flow and the particles and/or a purposeful discharge of the separated particles.

In an exemplary embodiment of the inventive separating device, the at least one flow guide surface of the valve element has at least one passage hole for the gas flow, wherein a fluid passage particularly can be realized in a closed position of the valve element relative to the valve seat. In the closed position, the valve element is in abutting contact with the valve seat in order to prevent the fluid passage of the gas flow through the flow passage opening. Due to the at least one passage hole, however, the gas flow can also flow through the gas passage opening in the closed position. At least one abutting contact surface of the valve element and/or the valve seat, which are in abutting contact in the closed position, may alternatively or additionally be profiled and/or contoured in such a way that a fluid passage is also allowed in the closed position. Due to the profiling or contouring of the abutting contact surface, the abutting contact surfaces of the valve seat and the valve element are not in sealing contact over the entire circumference in order to ensure the fluid passage. According to an enhancement, the at least one guide projection and/or the at least one guide depression and the at least one passage hole and/or the profiling or contouring of the abutting contact surface may be adapted to one another, arranged relative to one another, in such a way that the at least one guide projection and/or the at least one guide depression guides the gas flow toward the at least one passage hole and/or the profiling. This enhances the separation efficiency of the inventive separating device, particularly in that the gas flow can after flowing along the at least one guide projection and/or the at least one guide depression be guided toward the at least one passage hole and/or the profiling, through which the gas flow can reach the separation space, such that the lowest dynamic pressure possible is generated.

In an exemplary embodiment, the valve seat and/or the valve element is realized rotationally symmetrical and a group of multiple guide projections and/or guide depressions is arranged on the respective flow guide surfaces of the valve seat and/or the valve element in a uniformly distributed manner in the rotating direction. The fluid passage flow in the closed position can be scaled with the number in the group of multiple guide projections and/or guide depressions in order to adjust a desired leakage fluid passage flow.

In an exemplary embodiment, the valve element comprises a rotationally symmetrical bowl upstream of the gas flow, particularly on an axial end of the valve element. A base of the bowl may axially protrude past an axial abutting point between the valve element and the valve seat by at least 5 mm, particularly by at least 10 mm, including by at least 10%, 20%, 30%, 40% or 50% of the longitudinal extent of the valve element. This proved advantageous in keeping the overall axial dimension of the separating device as small as possible, wherein this is particularly advantageous in separating devices, in which little structural space is available. According to an enhancement, the at least one guide projection and/or the at least one guide depression is arranged on the bowl base and extends away from the bowl base in the main flow direction, such that the at least one passage hole for the gas flow is formed.

According to another exemplary embodiment, the at least one guide projection and/or the at least one guide depression is arranged on a shell of the bowl that extends from the bowl base in the main flow direction and/or on a collar of the bowl that leads into the bowl shell and/or on a guide pin that extends from the bowl base in the main flow direction and serves for axially guiding the valve element, particularly on a housing of the separating device. The inventive separating device therefore is not limited to certain arrangements or positions of the guide projections/guide depressions. They merely have to be arranged on flow guide surfaces of the valve element and/or the valve seat in such a way that they can come in contact with the gas flow impinging upon the separating device in order to achieve the inventive effect of enhancing the separation efficiency by generating a swirling flow.

In one embodiment, the valve seat forms a rotationally symmetrical hollow body, which particularly is shaped complementary to the bowl. The hollow body particularly is tapered in a closing direction extending opposite to the actuating direction, wherein the bowl particularly can be telescopically displaced into the actuating position and the closed position inside the hollow body. Alternatively or additionally, the hollow body guides the valve element during a displacement in the actuating direction and the closing direction and/or the hollow body defines the flow passage opening. The hollow body and/or the shell of the bowl initially extends in the closing direction in an essentially cylindrical manner and is then tapered in the radial direction, particularly in the shape of a funnel. The radially outer surfaces of the bowl, particularly the shell, and the radially inner surfaces of the valve element, particularly the hollow body, especially form flow guide surfaces, along which the particle-laden gas flow flows between the valve element and the valve seat. The cylindrical section and/or the tapered section of the hollow body and the shell are shaped complementary to one another in such a way that a gap with essentially constant gap width is formed between the shell and the hollow body in the closed position. The gap between the shell and the hollow body initially extends in the closing direction in an essentially cylindrical manner and is then tapered in the radial direction, particularly in the shape of a funnel. The gap width between the shell and the hollow body particularly is increased by displacing the valve element in the actuating direction. During a displacement of the valve element in the actuating direction and in the closing direction, this valve element particularly is displaced into and out of the hollow body in a telescopic manner. Depending on the respective embodiment, the gap width in the closed position can be increased or decreased. The flow resistance to the gas through-flow increases as the gap width decreases and vice versa. A reduction of the gap width particularly makes it possible to enhance the guiding function of the valve seat relative to the valve element.

In an exemplary embodiment of an inventive separating device, a spring, such as a coil spring, pretensions the valve element into the closed position in the axial direction, such as in the closing direction, particularly opposite to the axial actuating direction. For example, the spring may be supported on the valve element and cause a displacement of the valve element into the closed position. The spring may be designed, for example, in such a way that it is in an non-actuated, undeformed idle state or pretensioned, particularly pre-deformed, to a certain extent in the closed position of the valve element such that a spring force acts upon the valve element in the axial closing direction continuously, i.e. also in the closed position, wherein this makes it possible, in particular, to adjust and/or improve the response characteristic of the valve element. The term response characteristic generally refers to the responsiveness of the valve element to gas pressure fluctuations.

According to an enhancement of the inventive separating device, the spring may have a progressive spring constant and/or an additional spring may be arranged in series with the spring in the axial actuating direction. For example, the at least one spring may be progressively coiled. The at least one spring and the at least one additional spring may be arranged in series in the axial direction in such a way that the upstream spring near the valve element has a lower spring constant than the downstream spring. The spring near the valve element particularly is supported on the valve element and the downstream spring is supported on the spring near the valve element and/or on a housing part such as a cover of the separating device, which lies opposite of the valve seat.

Alternatively or additionally, the spring constant may increase linearly or exponentially. In addition to the use of progressively coiled springs and a serial arrangement of springs, it would also be possible to arrange multiple springs in parallel for this purpose. However, it proved advantageous to use a spring with progressively coiled spring core and/or a serial arrangement of springs with different spring constants and to place the spring or springs over the guide pin because an additional space requirement in the radial direction for multiple springs arranged in parallel can thereby be prevented. With respect to the progressive spring characteristic, it proved advantageous to choose the progression in such a way that the spring constant increases as the valve element is displaced in the actuating direction. In this way, it can particularly be ensured that the valve element is also displaced from the closed position into an open position at a low fluid pressure of the gas flow, but the maximal open position is only reached at high fluid pressures. In comparison with a spring that has a constant spring characteristic and, in particular, the same overall axial extent, the response characteristic of the valve element can thereby be adapted over a greater fluid pressure range of the gas flow.

In another embodiment, the device comprises a multipart housing, wherein the housing particularly has an inflow housing part that contains the flow passage opening and a cover part that can be connected to the inflow housing part, and wherein the valve element and the spring are supported in the housing and/or wherein the housing parts are connected to one another by means of a clip connection and/or wherein the housing, particularly the inflow housing part, can be connected to the crankcase by means of a tongue-and-groove connection. The inflow housing part and the valve seat are realized integrally.

The housing particularly defines a separation space, wherein the gas flow particularly flows into this separation space through the flow passage opening and out of said separation space through separating nozzles. Embodiments of these separating nozzles are described further below. The separation space particularly comprises a flow space between the valve seat and the inflow housing part, particularly the valve element, and/or a bypass space between the valve element and the cover part. The flow space and the bypass space are connected by at least one leakage opening in the valve element, by contouring an abutting contact point of the valve seat and/or valve element, particularly the abutting point, and/or by the passage opening between the valve seat and the valve element in an open position. The flow space is also referred to as gap between the valve seat and the valve element below.

The inflow housing part is designed for being fastened on a gas flow source with a gas outlet opening, particularly on a crankcase. The gas flows from the gas outlet opening of the gas flow source into the flow passage opening of the valve seat, which particularly is realized integrally with the inflow housing part. The inflow housing part comprises an annular recess, particularly an annular space, which extends in the actuating direction, especially radially outside the flow passage opening, wherein said annular space particularly is closed in the actuating direction and open in the closing direction. The annular space, which is open in the closing direction, particularly protrudes beyond the abutting point in the actuating direction.

The cover part particularly comprises the passage opening for the guide pin and/or the supporting point for the spring on the housing side. At least one emergency ventilation opening, especially just one emergency ventilation opening, particularly may be provided in the cover part.

Gas flows particularly can be discharged from the separating device and/or from a gas flow source such as a crankcase through the emergency ventilation opening in case of a blockage of the valve element and/or the valve seat, e.g. due to icing, such that especially the ventilation function of the separating device is preserved. The emergency ventilation opening particularly makes it possible to bypass the flow space and/or the bypass space and to discharge the gas flow past the valve element and/or the valve seat through the emergency ventilation opening. In this case, the gas flow enters the housing through the inflow housing part and exits the housing through the emergency ventilation opening, wherein the entry into the inflow housing part particularly takes place via a bypass, and wherein the gas flow particularly does not pass the flow passage opening of the valve seat. The emergency ventilation opening in the cover part extends radially inward and/or outward beyond the radial web and/or beyond the abutting point. With respect to the circumferential direction, the emergency ventilation opening particularly extends about the rotational axis of symmetry of the valve element and/or the valve seat over 10° to 150°, including over 20° to 120°, or over 30° to 90°. The radial web particularly is interrupted at the circumferential position of the emergency ventilation opening, especially by providing a bypass passage opening in the housing inflow part, in order to thereby form a bypass for the gas flow in the housing inflow part. The emergency ventilation opening is realized in the form of annular sections or angularly, particularly quadrangular.

According to another embodiment, which can be combined with the preceding embodiments, a particle separator is made available. The inventive particle separator comprises at least two devices for separating particles such as oil particles from a gas flow, from a blow-by gas of a crankcase ventilation, in an internal combustion engine. In this case, the at least two separating devices particularly are realized in accordance with the separating devices described with reference to the preceding embodiments.

The at least two devices respectively comprise a valve seat that defines a flow passage opening and a movable valve element. The valve element can be displaced between a closed position, in which the valve element is in abutting contact with the valve seat and the abutting contact may define an axial abutting point, and at least one open position, in which the valve element is moved from the axial abutting point in an axial actuating direction.

The at least two devices particularly are fluidically connected to one another in such a way that a gas flow can be divided between the two devices upstream of the particle separator and/or a gas flow can flow from one device into the other device. For example, the at least two devices may be arranged parallel to one another, wherein parallel should be interpreted in such a way that a gas flow impinging upon the particle separator can flow into both of the at least two devices, for example be divided between the two devices. The inventive arrangement of the at least two devices, particularly in an inventive particle separator, makes it possible to significantly increase the separation rate. Since the gas flow exiting one device can after the particle separation in this device flow into the other of the at least two devices for another particle separation, the resulting gas flow is significantly cleaner and can subsequently be returned, for example, to the fresh air supply of the internal combustion engine.

With respect to other exemplary embodiments of the separating devices, the preceding embodiments may be referenced, which may likewise apply in this context.

According to another embodiment, a crankcase ventilation system of an internal combustion engine is made available. Generic crankcase ventilation systems typically serve for preventing a pressure increase within the crankcase, which particularly results from blow-by gases from the combustion cycle of the internal combustion engine. The crankcase ventilation system comprises a crankcase with a flow outlet opening, through which the blow-by gas can exit the crankcase. For example, a pipeline system may be connected to the flow outlet opening of the crankcase. According to the invention, the crankcase ventilation system comprises a device that is fluidically connected to the flow outlet opening and serves for separating particles such as oil particles from the blow-by gas, wherein the separating device is realized in accordance with one of the preceding embodiments.

BRIEF DESCRIPTION OF THE DRAWINGS

Other properties, advantages and characteristics of the invention can be gathered from the following description of the embodiments with reference to the attached exemplary drawings, in which.

DETAILED DESCRIPTION

In the following description of exemplary embodiments, an inventive device for separating particles is also simply referred to as separating device and generally identified by the reference symbol 51. The separating device as a whole is described in detail with reference to FIG. 10, which show an inventive particle separator that is generally identified by the reference symbol 53.

Figure 1:
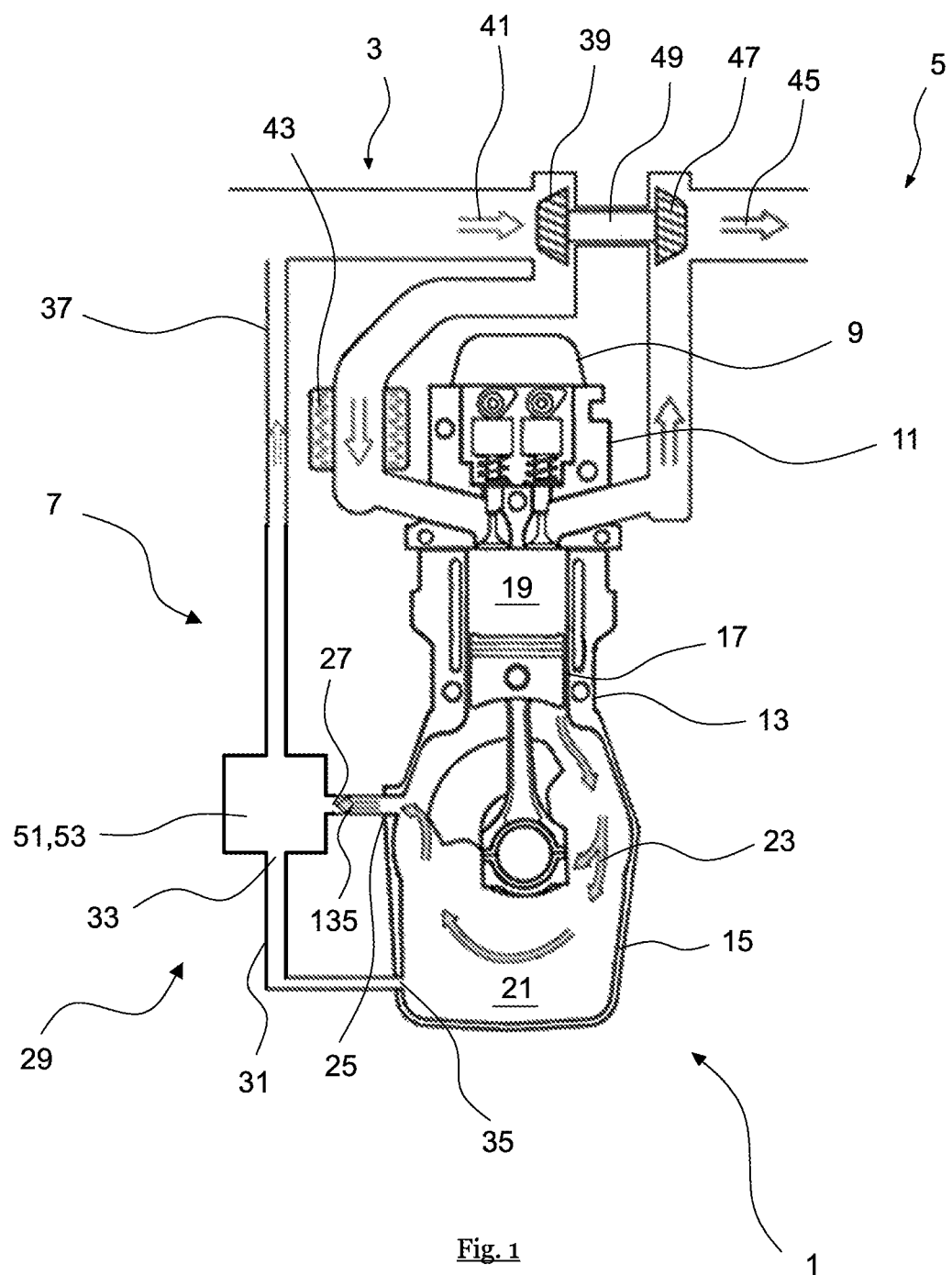
FIG. 1 shows an inventive crankcase ventilation system in the form of a schematic diagram of an example of the formation of blow-by gases and of the installation position of inventive separating devices and particle separators.

FIG. 1 shows an embodiment of an inventive crankcase ventilation system of an internal combustion engine, which is identified by the reference symbol 29 below. The crankcase ventilation system 29 comprises a crankcase 15 with a flow outlet opening 25, through which blow-by gas can exit the crankcase 15, and an inventive separating device 51 that is fluidically connected to the flow outlet opening 25 and schematically indicated in FIG. 1. It should be clear that an inventive particle separator 53 may also be fluidically coupled to the outlet opening instead of the inventive separating device 51 in order to form an inventive crankcase ventilation system 29. According to FIG. 1, the fluidic connection between the separating device 51 and the flow outlet opening 25 may be realized by means of a pipeline system such as an outlet pipe 135, which fluidically connects the flow outlet opening 25 of the crankcase to the flow passage opening 27 of the separating device 51. In a (not-shown) alternative embodiment, the separating device 51 may be mounted on the crankcase 15 in such a way that the flow passage opening 27 of the separating device 51 corresponds to the flow outlet opening 25 of the crankcase 15.

FIG. 1 furthermore shows an example of the formation of blow-by gas and of the general installation position of separating devices 51 and particle separators 53. This figure shows an internal combustion engine 1 that is fluidically coupled to a fresh air supply 3, an exhaust gas discharge 5 and a crankcase ventilation 7. The internal combustion engine 1 comprises a cylinder head cover 9, a cylinder head 11, a cylinder 13 and a crankcase 15. A piston 17 is guided in the cylinder and separates a swept volume 19 from a crankcase interior 21. Not-shown sealing rings are provided between the piston 17 and the cylinder 13 in order to seal the swept volume 19 relative to the crankcase interior 21. Nevertheless, combustion gases and/or unburnt gases flow from the swept volume 19 into the crankcase interior 21 between the piston 17 and the cylinder 13. The resulting gas flow 23 is also referred to as blow-by gas flow and not only contains air and oil, but also combustion gases and unburnt fuel components.

In order to prevent a pressure increase in the crankcase 15, the gas flow 23 is discharged from the crankcase 15 by means of a crankcase ventilation 7 and fed to the fresh air supply 3. In this case, the crankcase ventilation 7 particularly comprises the fluidic coupling between the flow outlet opening 25 of the crankcase 15 and the flow passage opening 27 of the separating device 51. The separating device 29 furthermore is fluidically connected to the crankcase 15 by means of a return pipe 31 for returning separated particles such as oil. The return pipe 31 fluidically connects, in particular, a return outlet 33 of the separating device 29 to a return inlet 35 on the crankcase 15. Furthermore, a return pipe 37 fluidically connects the separating device 51 to the fresh air supply 3 upstream of the separating device 29 in order to feed a gas flow, from which particles such as oil have been separated, to the fresh air supply 3. The resulting fresh air flow 41 is compressed by means of a compressor wheel 39 and fed to the internal combustion engine 1 through the cylinder head 11 by means of a charge air cooler 43. Combustion gases that do not reach the crankcase 15 between the piston 17 and the cylinder 13 are fed to a turbocharger 47 in the form of exhaust gas 45 by means of an exhaust gas discharge, wherein said turbocharger drives the compressor wheel 39 in the fresh air supply 3 via a shaft 49.

It should be clear that the installation position of the inventive separating device 51 is in an application as an oil separator in internal combustion engines not limited to the installation position illustrated in FIG. 1 and also not limited to the use in a crankcase ventilation system 29. For example, the separating device 51 could also be used for separating particles from gas flows that exit the internal combustion engine 1 between the cylinder 13 and the cylinder head 11 and/or between the cylinder head 11 and the cylinder head cover 9. Another potential field of application can be seen in the fresh air supply 3 and/or in the exhaust gas discharge 5, which particularly may be fluidically coupled to one another by means of the shaft 49 connecting the compressor wheel 39 and the turbine wheel 47. The valve elements 55 and/or valve seats 73 illustrated in FIGS. 2 to 10 comprise flow guide surfaces 99, 171 for deflecting the gas flow such that particles are separated from the gas flow due to the impact of the particles on the flow guide surfaces 99, 171. In this context, the term flow guide surfaces 99, 171 refers to the surfaces of the valve element 55 or the valve seat 73, which come in contact with and deflect and/or guide the gas flow. The flow guide surfaces 99, 171 particularly are formed on an outer surface 100 of the valve element 55, which faces away from the axial actuating direction A. The flow guide surfaces 99 are formed by the bowl 57, particularly the shell 61, and the valve element collar 67. The flow guide surfaces 99 of the valve element 55 define the annular space 69, which is open in the closing direction S, such that a gas flow flowing toward the valve element 55 in the actuating direction A is deflected and/or guided.

Figure 2:
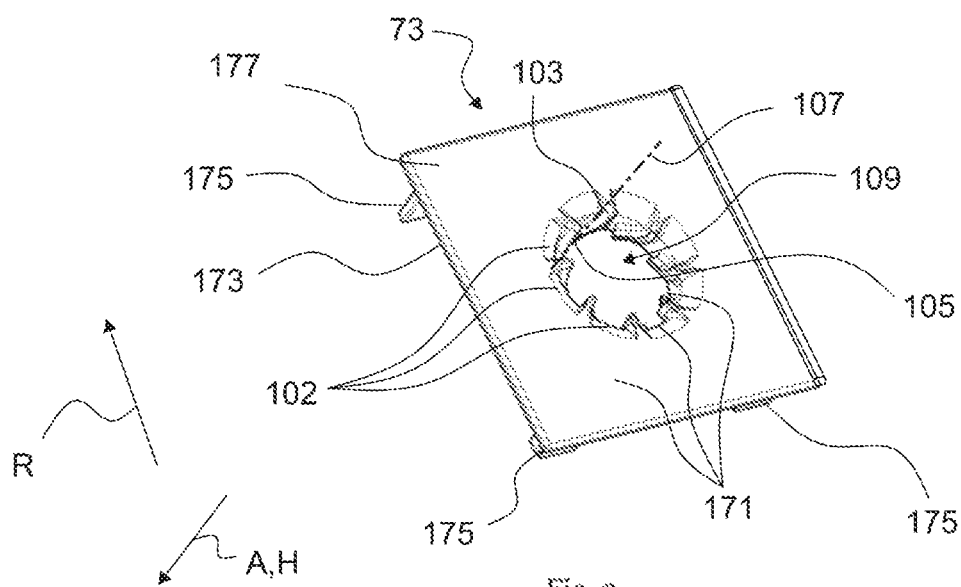
FIG. 2 shows a perspective view of a valve seat for a separating device.
Figure 3:
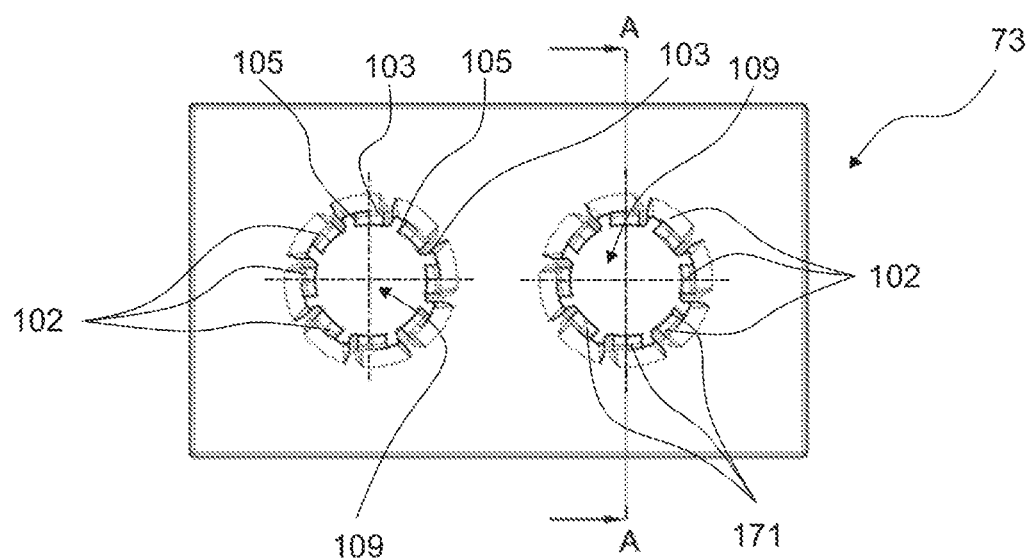
FIG. 3 shows a bottom view of another embodiment of a valve seat according to FIG. 2.
Figure 4:
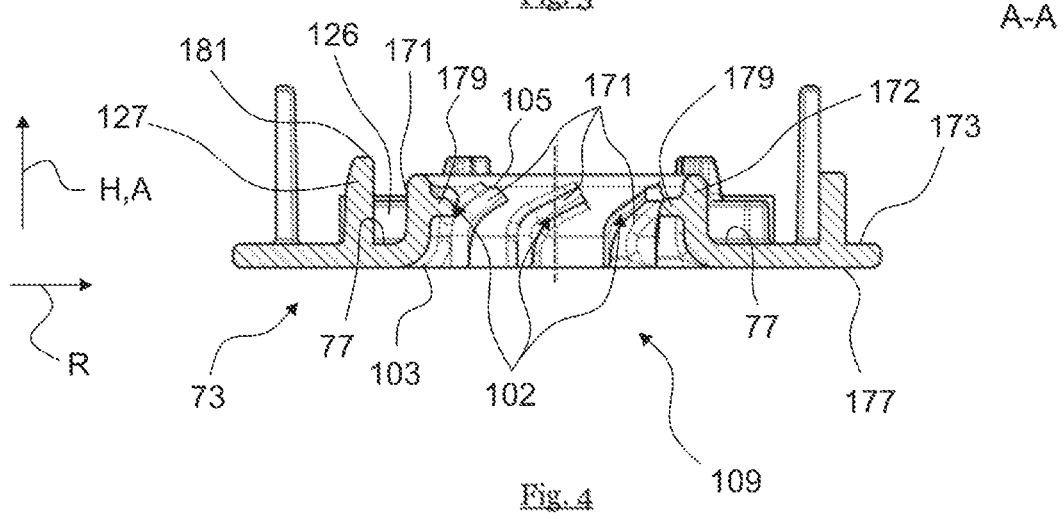
FIG. 4 shows a section through the valve seat according to FIG. 2 along the line of section A-A in FIG. 3.
Figure 5:
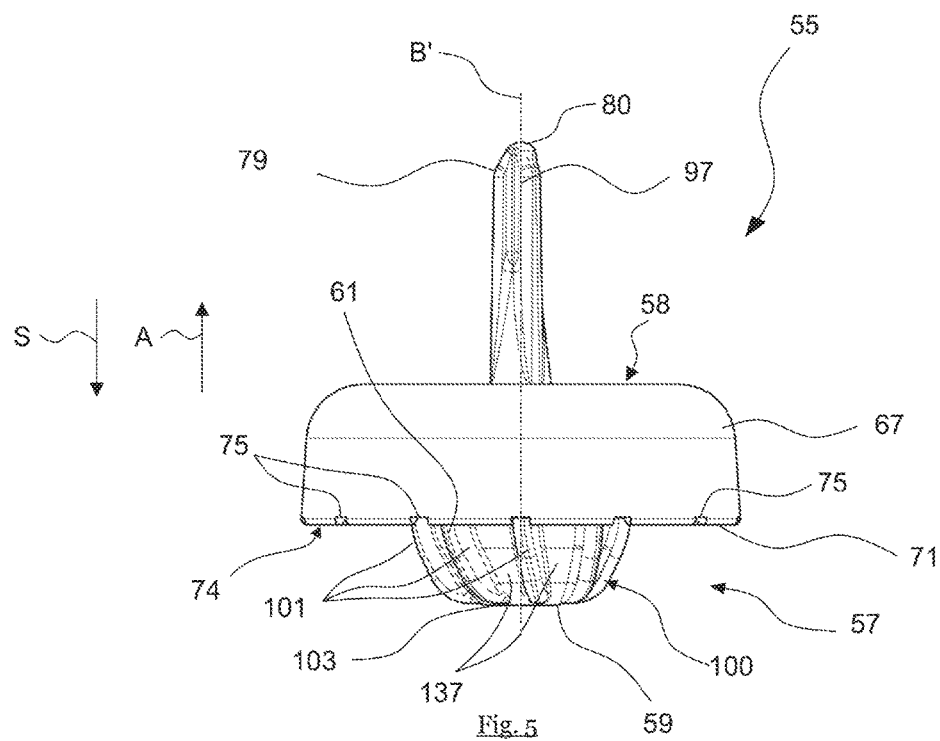
FIG. 5 shows a side view of a valve element for a separating device.
Figures 6, 7:
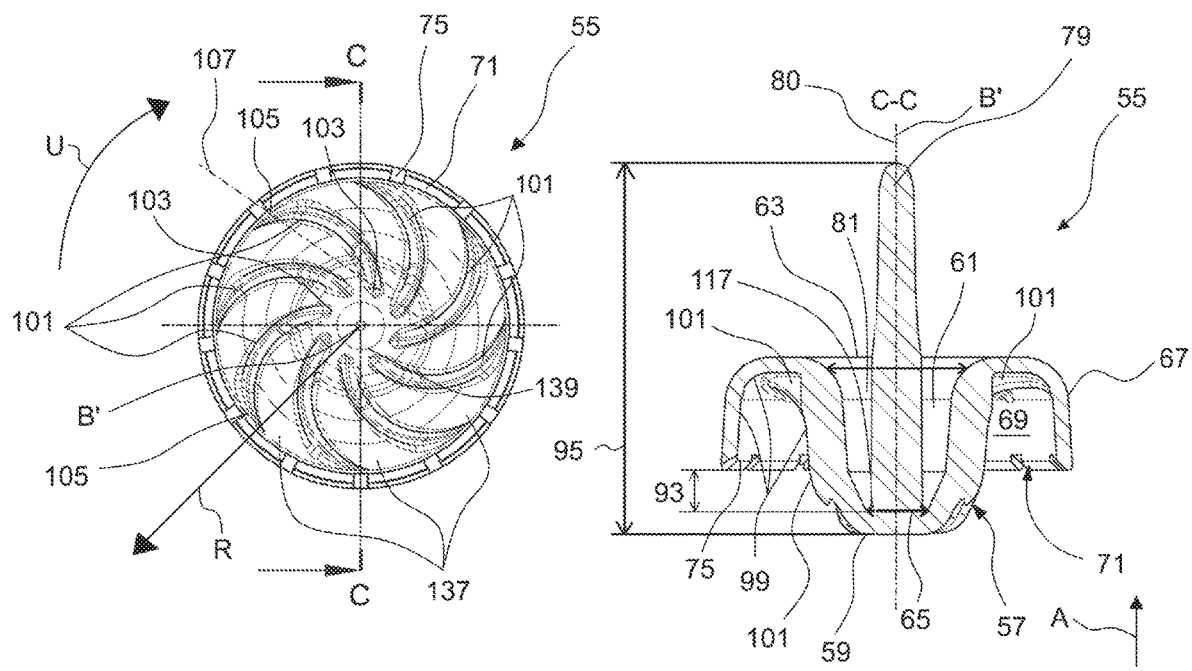
FIG. 6 shows a bottom view of the valve element according to FIG. 5.
FIG. 7 shows a section through the valve element according to FIG. 5 along the line of section C-C in FIG. 6.

FIGS. 2 to 4 show an exemplary valve seat 73 of an inventive separating device 51. The valve seat 73 has the shape of an essentially planar plate with rectangular cross section, the wall thickness of which is significantly smaller than its planar extent. The valve seat 73 has an approximately central flow passage opening 109, through which the gas flow impinging upon the valve seat 73 in a main flow direction H at least partially flows in order to reach a separation space 115 (FIG. 10) of the separating device 51. In addition, the valve seat has fastening projections 175 on a surface 173 that points in the main flow direction H, wherein said fastening projections may interact with another housing part of the separating device 51, for example, by means of a tongue-and-groove connection. The flow passage opening 109 has an essentially round cross section. The flow guide surfaces 171 of the valve seat 73 are located on an impact surface 177 that lies opposite of the surface 173. Turbine blade-like guide projections 102 extend from the impact surface 177 through the flow passage opening 109 such that additional flow guide surfaces 171 are formed. The turbine blade-like guide projections 102 are therefore arranged in such a way that a gas flow flowing through the flow passage opening 109 is deflected by means of the guide projections 102 in order to generate a swirling flow that enhances the separation efficiency of the inventive separating device 51. Since the inventive guide projections 102 are provided on the valve seat 73, a separation effect of the separating device 51 can already be achieved at an early stage. The guide projections 102 extend in the flow passage opening 109 in an essentially helical manner with respect to the main flow direction H. In this case, the guide projections 102 respectively have an inflow profile lug 103 and an inflow profile rear edge 105 such that the gas flow impinging upon the valve seat 73 initially comes in contact with the inflow profile lug 103, is then guided along the flow guide surfaces 171 by means of the guide projections 102 such that a swirling flow is generated and ultimately exits the guide projections 102 along the inflow profile rear edge 105. An imaginary connecting line between the inflow profile lug 103 and the inflow profile rear a edge 105 forms a profile chord, which is indicated with a dot-dash line in FIG. 2 and oriented askew with respect to the main flow direction H. For example, an angular extent of the guide projection 102 lies in the range between 30° and 90°. In this context, the term angular extent refers to the longitudinal profile extent of the guide projection 102 from the inflow profile lug 103 to the inflow profile rear edge 105 with respect to a not-shown reference point, about which the guide projection 102 is helically coiled. An angular and/or axial and/or radial acceleration component is imparted upon the gas flow as it flows along the at least one guide projection 102, wherein the axial acceleration component is oriented in the main flow direction H and the radial acceleration component is oriented in the radial direction R. In this way, the separation time for separating the particles by means of the separating device 51 can be significantly prolonged, particularly by at least 10% with respect to a separation time of a separating device without at least one guide projection 102 and/or at least one guide projection 101 (FIG. 5 to FIG. 7).

Figure 10:
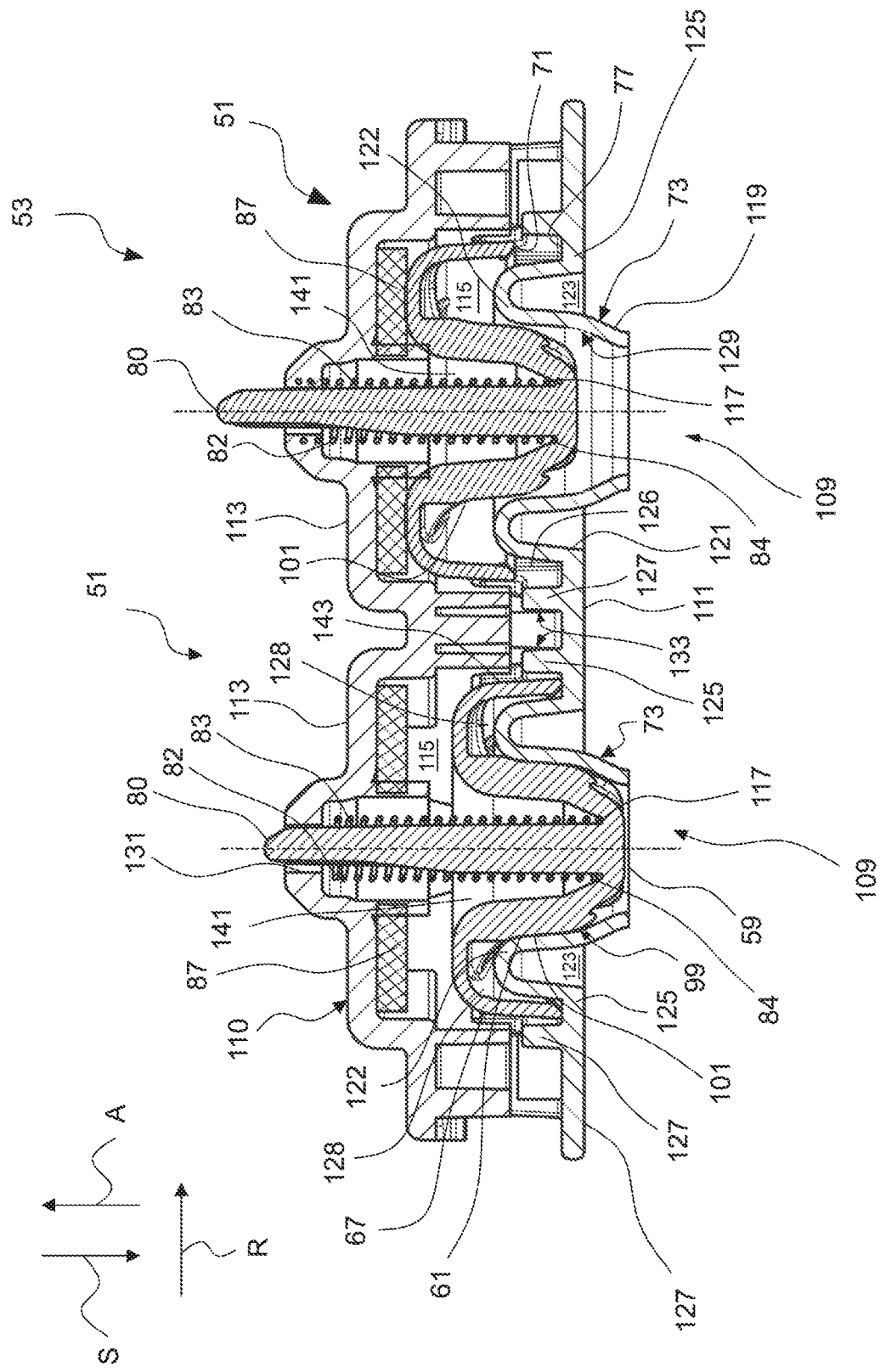
FIG. 10 shows a sectional view of a particle separator with two separating devices, wherein the left separating device is illustrated in the closed position and the right separating device is illustrated in the open position.

FIG. 3 shows an exemplary embodiment of the valve seat 73, in which two adjacently arranged flow passage openings 109 are provided and can respectively interact with a valve element 55 in order to realize an inventive separating device 51. Such a valve seat 73 can also be used, for example, in an inventive particle separator 53 (FIG. 10). The adjacently arranged flow passage openings 109 essentially are realized identically. The arrangement of the flow passage openings can also be referred to as a parallel arrangement because the gas flow impinging upon the valve seat 73 can be divided between the two adjacently arranged flow passage openings 109 such that part of the gas flow can flow through the flow passage opening 109 illustrated on the left in FIG. 3 and part of the gas flow can flow through the flow passage opening 109 illustrated on the right in FIG. 3. The gas flow is transformed into a swirling flow on both flow passage openings 109 in order to enhance the separation effect.

FIG. 4 shows a section through one of the two flow passage openings 109 along the line of section A-A indicated in FIG. 3. A lug 179 that protrudes in the radial direction R is visible in the sectional view according to FIG. 4 due to the helical, turbine blade-like guide structure shape 101. This figure shows the three-dimensional extent of the guide projection 102 that helically extends about the axial direction A or main flow direction H, respectively. A circumferential collar 121 around the flow passage opening 109 extends away from the surface 173 of the valve seat 73 in the axial direction A. The collar 121 serves for deflecting the gas flow as described in greater detail below with reference to FIG. 10. FIG. 4 also shows that the collar 121 does not extend around the entire flow passage opening 109. According to FIG. 4, the collar is located on the left of the flow passage opening 109 whereas no collar extends away from the surface 173 on the right of the flow passage opening 109. Gaps, through which the gas flow can flow, are thereby formed between the partially circumferential valve seat collar sections 121, wherein particles are separated from the gas flow while it flows past the valve seat collar sections 121, particularly due to the impact of the particles on the valve seat collar. According to FIG. 10, in particular, the valve seat collar 121 cooperates with a valve element collar in order to guide and deflect the gas flow. The gas flow entering the flow passage opening 109 in the main flow direction H initially is partially deflected by the flow guide surfaces 99 of the valve element 55 and guided in the direction of the flow guide surfaces 99 of the valve element collar, which causes a deflection of the gas flow by 180°, i.e. opposite to the main flow direction H. In this case, the gas flow is directed into the annular gap 126 being formed between the valve seat collar 121 and the web 127 in that the gas flow initially is guided in the direction of the abutting point 77 in order to impinge thereupon for further separation and ultimately is once again deflected by 180° in the main flow direction H by means of the web 127. After passing the web 127, the gas flow can exit the separating device 51, for example, through a separating nozzle 133 (FIG. 10).

An additional particle separation can be realized on an edge 181 facing the valve element 55 in that the separated particles drip off the edge 181.

In the exemplary embodiment illustrated in FIGS. 2 to 4, the guide projections 102 are arranged on the flow guide surfaces on the radially inner side of the valve seat 73. However, it is also conceivable to arrange the guide projections 102 on a radially outer flow guide surface 171 of the valve seat collar 121 and to thereby impart a swirl on the gas flow in the annular space 126.

It should be clear that the specific details described with reference to the guide projections 102 of the valve seat 103 may also be relevant to the guide projections 101 of the valve element 55 described below, wherein not all details are discussed anew in order to improve the readability of the present application.

FIGS. 5 to 7 show an exemplary embodiment of a valve element 55 for an inventive separating device 51 in the form of a side view (FIG. 5), a bottom view (FIG. 6) and a section along the line of section C-C (FIG. 7). The valve element 55 comprises a bowl 57 with a bowl base 59 that essentially extends in the radial direction R, particularly in a disk-shaped manner. A shell 61 essentially extends from the bowl base 59 in the actuating direction A. The shell 61 and the bowl base 59 form a bowl 57 that is open toward a side 58 in the actuating direction A. The shell 61 is tapered in a closing direction S extending opposite to the actuating direction A and leads into the disk-shaped bowl base 59. The bowl base 59 and the shell 61 are realized rotationally symmetrical, wherein the taper of the shell 61 is limited in such a way that the maximal inside diameter 63 of the shell 61 is no more than 30%, 50%, 70% or 110% greater than the minimal inside diameter 65 of the shell 61.

A valve element collar 67 respectively borders on or leads into the shell 61, particularly the end of the shell 61 pointing in the actuating direction A. The valve element collar 67 is realized rotationally symmetrical and initially extends from the shell 61 essentially in the radial direction R, particularly in an arc-shaped manner, and then essentially in the closing direction S. The valve element collar 67 and the bowl 57, particularly the shell 61, define an annular space 69 of the valve element 55 that is open in the closing direction S.

An end of the collar 67 that points in the closing direction S forms an essentially circumferential abutting contact surface 71 of the valve element 57 for the abutting contact between the valve element 57 and the valve seat 73. An abutting contact between the valve element 55 and the valve seat 73 can be gathered from the separating device 55 illustrated on the left in FIG. 10. A circumferential direction is identified by the reference symbol U below.

According to FIGS. 5 to 9, the abutting contact surface 71 of the valve element 57 and/or an abutting contact surface 77 of the valve seat 73 may be contoured in order to allow a fluid passage in the closed position, i.e. in the abutting contact, of the separating device 51. The contouring of the at least one abutting contact surface 71, which is generally identified by the reference symbol 74, may comprise at least one projection and/or at least one depression. For example, a (not-shown) gap, which at least sectionally extends in the circumferential direction U, is formed between the valve element 55 and the valve seat 73 in the closed position due to this contouring 74. In this case, a gap extent in the circumferential direction U and/or a gap dimension in the axial direction can be realized in dependence on a predefined leakage gas volume flow, which should be allowed in the closed position. In the embodiments shown, the contouring comprises multiple depressions 75 (recesses) on the abutting contact surface 71 of the valve element collar 67. The multiple depressions 75 are circumferentially distributed on the contouring, particularly on the valve seat collar, in an equidistant manner. In the present embodiment, the contouring comprises thirteen depressions 75. However, more or fewer depressions 75 may also be provided. In the examples shown, the depressions 75 are illustrated with an exemplary rectangular cross section. However, they may also have other cross-sectional shapes such as, for example, that of a circle, an ellipse, a triangle, a pentagon, etc. It proved advantageous to incline the depressions 75 downstream in the closing direction S starting from a plane extending in the radial direction R in order to direct the passage taking place through the contouring at the abutting contact surface 77 of the valve seat 73, wherein the separation rate, i.e. the efficiency of the separating device 51, can thereby be increased.

The flow guide surfaces 99 of the valve element 55 comprise at least one turbine blade-like guide projection 101 that transforms the gas flow into a swirling flow in order to increase the separation rate of the separating device 51, wherein at least one turbine blade-like guide depression may alternatively or additionally be provided for this purpose. According to the embodiment in FIGS. 5 to 10, multiple guide projections 101 are provided in order to improve the effect thereof. The turbine blade-like guide projections 101 extend along the bowl 57 of the valve element 55, particularly along the shell 61. It proved advantageous to form the guide projections 101 on the shell 61 of the bowl 57. The guide projections 101 may alternatively or additionally also be provided on the valve element collar 67 and/or on the bowl base 59 of the valve element 55.

The guide projections 101 according to the exemplary embodiment are realized helically. In this case, the guide projections 101 particularly are realized in the form of continuously extending material webs that helically extend about a rotational axis of symmetry B of the valve element 55. The guide projections 101 respectively comprise an inflow profile lug 103 and an inflow profile rear edge 105, wherein the gas flow impinging upon the valve element 55 initially comes in contact with the inflow profile lug 103, is then guided along the flow guide surfaces 99 by means of the guide projections 101 in order to generate a swirling flow and ultimately exits the guide projections 101 along the inflow profile rear edge 105. A connecting line between the inflow profile lug 103 and the inflow profile rear edge 105 forms a profile chord that is indicated with the reference line 107 and extends askew with respect to a main flow direction, particularly the actuating direction A. In an embodiment, in which the guide projections 101 are helically realized on the shell 61, the profile chord 107 can starting from the profile lug 103 be described as a vector that has a component in the radial direction R, a component in the axial actuating direction A, as well as a component in the circumferential direction U, particularly an angular offset in the circumferential direction U. However, a vector describing the profile chord 107 does not have to have each of these directional components. For example, profile chords that only have components in the radial direction R and in the circumferential direction U, in the radial direction R and in the actuating direction A or in the circumferential direction U and in the actuating direction A would also be conceivable. Eight rotationally symmetrical guide projections 101 are provided in the example of a valve element 55 illustrated in FIGS. 8 to 10. The guide projections 101 are arranged on the respective flow guide surfaces 99 of the valve element 55 such that they are uniformly distributed in the circumferential direction U.

The guide projections 101 of the valve element 55, as well as the guide projections 102 of the valve seat 73, have curved surfaces, along which the gas flow is guided. In this case, there is not only a curvature along the helical extending direction of the guide projections 101, 102, but also a turbine blade-like curvature with respect to a guide projection dimension transverse to its extending direction, wherein the separation effect can thereby be enhanced because the curvature imparts additional acceleration components upon the gas flow.

Figure 8:
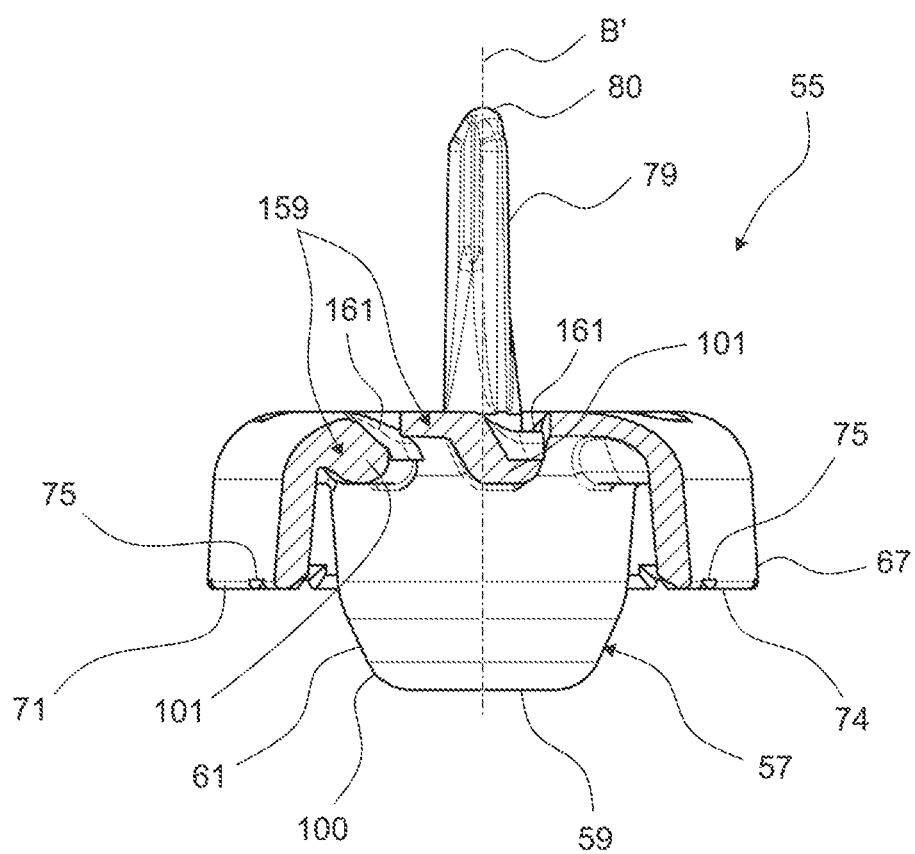
FIG. 8 shows a partially sectioned side view of another embodiment of a valve element for a separating device.
Figure 9:
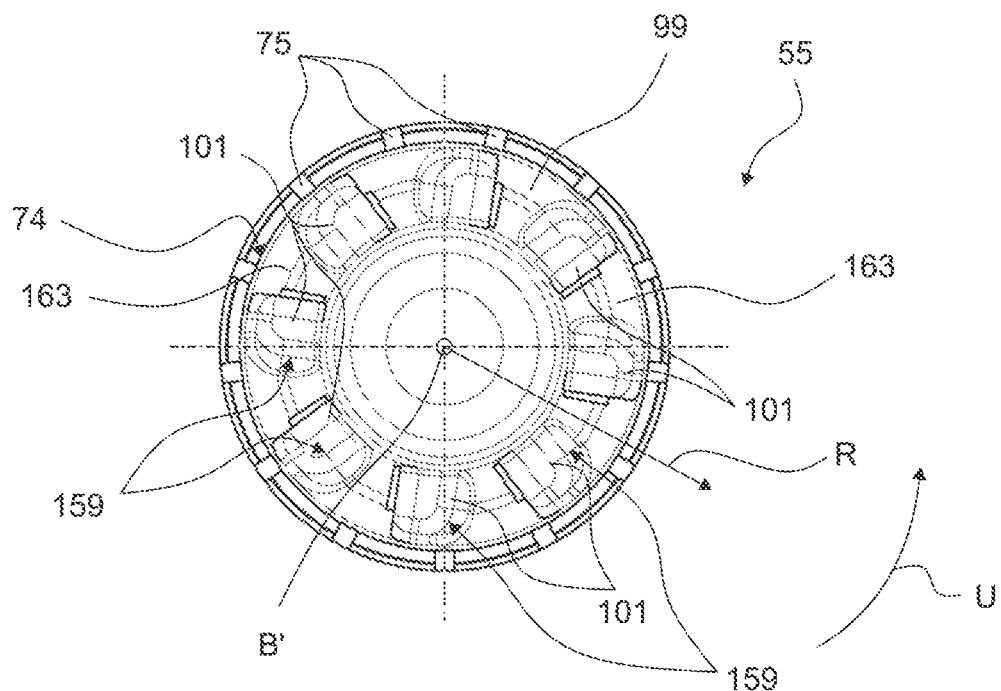
FIG. 9 shows a bottom view of the valve element according to FIG. 8.

FIGS. 8 to 9 show an exemplary embodiment of a valve element 55 for an inventive separating device 51 in the form of a side view (FIG. 8) and a bottom view (FIG. 9), wherein fluid passage elements 159 are provided in this embodiment in order to allow a fluid passage in the closed position. In this context, it should be clear that the fluid passage elements 159 illustrated in FIGS. 8 and 9 may be provided additionally or alternatively to the leakage elements 85 or the contouring 74, respectively. Corresponding characteristics are identified by the same reference symbols in order to improve the readability of the application.

The fluid passage elements 159 are arranged on the flow guide surfaces 99 of the valve element 55. The fluid passage elements 159 are arranged in such a way that fluid passage openings 161, through which a fluid passage can be realized in the closed position, are formed on the flow guide surfaces 99. For example, the fluid passage elements 159 may be realized in the form of turbine blade-like guide projections 101 and/or in the form of turbine blade-like guide depressions, which also transform the gas flow into a swirling flow in order to increase the separation rate of the separating device 51. According to the embodiment illustrated in FIGS. 8 to 9, multiple guide projections 101 are provided in order to improve the effect thereof. The turbine blade-like guide projections 11 are arranged on an inner valve element collar surface 163 referred to the radial direction R. It is furthermore possible to arrange additional or alternative guide projections 101 and/or guide depressions on flow guide surfaces of the valve seat 73 (in a not-shown manner) in order to additionally increase the separation rate.

According to the exemplary embodiment, the guide projections 101 are shaped in a helical manner such that the fluid passage openings 161 are formed. In this case, the guide projections 101 particularly are realized in the form of material webs that continuously extend about a rotational axis B' of the valve element 55 in a helical manner, wherein the guide projections 101 are respectively tied to the flow guide surfaces 99 or the inner valve element collar surface 163 in such a way that the fluid passage openings 161 remain clear in order to allow a fluid passage.

FIG. 10 shows an exemplary embodiment of an inventive particle separator, which in this example comprises two inventive separating devices 51 that are fluidically connected to one another, wherein the left separating device 51 is illustrated in the closed position and the right separating device 51 is illustrated in the open position. The valve elements 55 of the separating devices 51 illustrated in FIG. 10 essentially corresponds to the valve element illustrated in FIGS. 5 to 7.

The separating devices 51 of the particle separator 53 are arranged parallel to one another and fluidically connected to one another. In this context, the term arranged parallel to one another refers to the separating devices 51 being arranged in such a way that a gas flow impinging upon the particle separator 53 can simultaneously flow into both separating devices 51 or be divided between the two separating devices 51, respectively. Each separating device 51 has a flow passage opening 109, by means of which a gas flow impinging upon the particle separator 53 can be divided between both separating devices 51. Although FIG. 10 merely shows the coupling of two separating devices 51 in the form of a particle separator 53, it should be clear that the preceding and following description of the separating devices 51 applies to a particle separator 53 with two separating devices 51, as well as to an individual separating device 53 and to a particle separator 53 with more than two parallel separating devices 51.

The separating device 51 particularly comprises a two-part housing 110. The housing comprises an inflow housing part 111 and a cover part 113 that respectively is or can be connected thereto. The inflow housing part 111 and the cover part 113 particularly may be separably connected to one another by means of a (not-shown) clip connection. The inflow housing part 111 particularly may be connected to the crankcase by means of a (not-shown) tongue-and-groove connection. In one embodiment, the inflow housing part 111 can be connected to the crankcase by means of a tongue-and-groove connection. The separating device 51 comprises a valve seat 73 that defines the flow passage opening 109. The valve seat 73 forms part of the housing 110, particularly the inflow housing part 111. The valve seat 73 and the inflow housing part 111 are made of one piece. In the particle separator 53 shown, the valve seats 73 of the two separating devices 51 and the inflow housing parts 111 are made of one piece. The cover parts 113 of the two separating devices 51 are likewise made of one piece. For example, die casting methods may be used for this purpose.

The housing 110 defines a separation space 115 for separating particles from the gas flow and for accommodating and guiding the valve element 55. The valve element 55 is mounted in the separation space 115. In the closed position, the valve element 55 is in abutting contact with the valve seat 73. During this abutting contact, the abutting contact surface 71 of the valve element 55 and the abutting contact surface 77 of the valve seat 73 contact one another. In this case, the valve element 55 is pressed against the valve seat 73 by means of a spring 83 that is supported on the valve element 55 with an axial end 84. An axial end 82 of the spring 83 lying opposite of the axial end 84 is supported on the cover part 113 of the housing. When the valve element 55 is acted upon by a gas flow with sufficient pressure, it is moved from the closed position into an open position in the actuating direction A. In this case, the gas flow acts against the spring force of the spring 83, wherein it would also be possible, for example, to provide a multi-spring arrangement such as a serial arrangement of at least two springs 83. The spring 83 supported between the valve element 55 and the housing cover 113 is compressed during a displacement of the valve element 55 in the actuating direction A. The spring force acting against the displacement motions of the valve element 55 increases as the displacement of the valve element 55 progresses in the actuating direction A. The spring characteristic can be adapted to a desired response characteristic of the valve element 55 by using springs with progressively coiled spring characteristic and/or by using a serial arrangement of multiple springs.

The spring 83 is placed over the guide pin 79 that extends from the bowl 57, particularly from the bowl base 59, in the actuating direction A. A passage opening 131 for the guide pin 79, into or through which the guide pin 79 respectively protrudes, is provided in a part of the housing, particularly the cover part 113, which lies opposite of the bowl base 59 in the actuating direction A. The passage opening 131 is dimensioned in such a way that it guides the valve element 55 during a displacement in the actuating direction and/or the closing direction A, S.

An axial extent 93 between the abutting surface 71 of the valve element 57 and the bowl base 59 in the actuating direction A of the guide pin 79 can be adapted in relation to an overall axial extent 95 in the actuating direction A of the valve element 55, particularly shifted in the closing direction S extending opposite to the actuating direction A, in order to reduce the required structural space in the actuating direction A. It proved advantageous to realize an axial extent 93 of the guide pin 79 between the abutting surface 71 of the valve element 57 and the bowl base 59 such that it corresponds to at least 10%, 20%, 30%, 40% or 50% of the overall axial extent 95 of the valve element 55. In this way, the axial extent of the valve element 55 and the separating device 51, into which the valve element is inserted, can be shifted in the closing direction S in order to thereby reduce the axial extent in the actuating direction A. Viewed in the actuating direction A, at least one guide lug 97 particularly extends in the radial direction R on an upper end 80 of the guide pin 79 in the actuating direction A, wherein multiple guide lugs 97 are provided as an example and essentially distributed on the guide pin 79 in the circumferential direction U. The guide lugs 97 particularly serve for guiding the guide pin 79, in a housing of the separating device 51, wherein the guide lugs 97 particularly may engage into (not-shown) guide grooves provided for this purpose.

The space requirement of the spring 83, particularly in the actuating direction A, is reduced in that the spring 83 is supported on the bowl 57, especially on the bowl base 59, wherein a supporting point 117 is viewed in the actuating direction A formed at a lowest point on a bowl side pointing in the actuating direction A. The space requirement for the spring 83 is alternatively or additionally reduced in that the supporting point 117 of the spring 83 and/or the bowl base 59 axially protrudes past the abutting point 71, 77 opposite to the actuating direction A in the closed position of the valve element 55. In this way, the overall extent of the separating device 51 required for the actuating travel of the spring 83 particularly can be partially shifted in the closing direction S in favor of the extent in the actuating direction A. This also makes it possible, in particular, to reduce the overall axial extent of an arrangement, particularly a crankcase ventilation system 29, which comprises a separating device 51 and a gas flow source that is connected to the separating device 51 upstream and particularly may be realized in the form of a crankcase, from which blow-by gas flows into the separating device. In this case, the invention utilizes the fact that the extent, which is shifted in the closing direction S in favor of the axial extent in the actuating direction A, protrudes into an already available structural space of the gas flow source such that the actuating travel of the spring 83 can be increased without reducing the overall axial extent of the arrangement.

The valve seat 73 is realized rotationally symmetrical. The valve seat 73 particularly comprises a hollow body 119 that is shaped complementary to the bowl 57 of the valve element 55. The bowl 57 and/or the hollow body 119 is tapered in the closing direction S. In this case, the bowl 57 and the hollow body 119 particularly are shaped complementary to one another. The bowl 59 can be telescopically displaced into the hollow body 119 in order to displace the valve element 55 into the closed position and/or open position. Due to the complementary design of the bowl 57 and the hollow body 119, the valve element 55 is guided in the actuating/closing direction A, S by the valve seat 73, particularly the hollow body 119, during a displacement in the actuating direction and the closing direction A, S. It should be clear that a certain relative motion of the guided valve element 55 is possible in a direction extending transverse, especially perpendicular, to the actuating/closing direction A, S. In fact, the term guided respectively refers to the motion of the guided part, i.e. the valve element 55, at least being restricted in other directions or to centering of the part, i.e. the valve element 55, taking place due to the guidance.

According to FIG. 10, a clearance s in the radial direction R exists between the bowl 57 and the hollow body 119 of the separating device 51 (illustrated on the right) in the present arrangement such that the guidance of the hollow body 119 allows a certain motion in the radial direction R. In contrast, a significantly smaller gap exists between the bowl 57 and the hollow body 119 of the separating device 51 (illustrated on the left) in FIG. 10 in the closed position.

The valve seat 73 furthermore comprises a valve seat collar 121 that leads into the hollow body 119. In this case, the valve seat collar 121 initially extends in the radial direction A in an arc-shaped manner from an end 122 of the hollow body 19 in the actuating direction A and then essentially in the closing direction S. The hollow body 119 and the valve seat collar 121 define an annular space 123 that is open in the closing direction S. The hollow body 119 and the valve seat collar 121 protrude into the annular space 115 defined by the valve element 55. In the closed position, the hollow body 119 and the valve seat collar 121 particularly are enclosed by the valve element 55 in the radial direction R.

The axial abutting point 77 (abutting contact surface of the valve seat 73) is formed by a radial web 125, into which the valve seat collar 121 leads. An axial web 127, which essentially extends in the actuating direction and the closing direction A, S, borders on the radial web 125 in the radial direction R. The valve seat collar 121, the radial web 125 and the axial web 127 define an annular gap 126 that is open in the actuating direction A and particularly guides the valve element 55 during a displacement in the actuating direction and in the closing direction S.

The valve elements 55 and valve seats 73 illustrated in FIG. 10 are realized in a collar-shaped manner and particularly can be telescopically displaced inside one another such that a collar-shaped gap 128 is formed between the valve element 55 and the valve seat 73, particularly in the closed position. The collar-shaped gap 128 particularly is formed between flow guide surfaces 129 of the valve seat 73 and flow guide surfaces 99 of the valve element 55. The flow guide surfaces 129 of the valve seat 73 particularly are formed by the inner surfaces of the hollow body 119 referred to the radial direction R, which come in contact with the gas flow, and by the outer surface of the valve seat collar 121 referred to the radial direction R. The collar-shaped gap 128 causes a deflection of the gas flow by at least 130°, 140°, 150°, 160°, 170° or 180°, wherein the gas flow flows between the flow guide surfaces 99, 129 of the valve element 55 and the valve seat 73.

The valve element 55 divides the separation space 115 defined by the housing 110 into a flow space between the valve element 55 and the valve seat 73 and a bypass space 141 between the valve element 55 and the cover part 113. The gas flow flows through the flow space along the flow guide surfaces 99, 129 between the valve seat 73 and the valve element 55. The gas flow can even reach the bypass space 141, in which particles can also be separated, in the closed position of the valve element 55 through the leakage elements 85, the contouring 74 or the fluid passage elements 159 in the valve element 55. Due to the contouring 74, the leakage elements 85 or the fluid passage elements 159 of the abutting surfaces 71, 77, a gas flow can also flow from one separating device 51 into the other separating device and vise versa in the closed position of both valve elements 55.

In FIG. 10, a fibrous web 87 is provided in the bypass space 141, wherein particles can be separated on said fibrous web. In this case, the gas flow does not have to flow through the fibrous web 87. It suffices if the gas flow impinges upon the fibrous web 87 in order to separate particles thereon. The fibrous web 87 is realized in a disk-shaped manner, particularly annularly, and fastened on the cover part 113 of the housing 110.

A separating nozzle 133 with constant through-flow cross section is arranged downstream of the valve element 55 for the nebulization and/or defined discharge of the gas flow. The separating nozzle particularly forms at least one gap between the housing cover 113 and the inflow housing part 111 in the installed state. Since the housing cover 113 and the inflow housing part 111 essentially are fastened to one another in an immovable manner, the cross section of the gap and therefore the through-flow cross section of the separating nozzle 133 essentially remain constant regardless of the position of the valve element 55. Due to this constant through-flow cross section, a minimal particle separation by means of the at least one separating nozzle 133 can also be ensured when the valve element 55 is completely opened. The separating nozzle 133 is arranged downstream of the abutting contact between the valve element 55 and the valve seat 73. An annular gap between the abutting contact surface 71 of the valve element 55 and the abutting contact surface 77 of the valve seat 73 is formed in the maximal open position. The through-flow cross section of this annular gap, particularly a clearance between the abutting contact surfaces 71, 77 of the valve element 50 and the valve seat 73 in the actuating direction A, is greater, especially at least 20%, 40%, 60%, 80% or 100% greater, than the maximal through-flow cross section of the separating nozzle 133, particularly than the axial extent of the gap between the housing cover 113 and the inflow housing part 111.

According to FIG. 10, at least two separating devices 51 can be fluidically connected to one another into a particle separator 53 in such a way that a gas flow can flow from one separating device 51 into the other separating device 51. The separating devices 51 particularly are fluidically connected to one another downstream of the separating nozzle 133. An exemplary embodiment of such a fluidic connection is illustrated in FIG. 10. In this case, a gas flow can exit the separation space 115 of one separating device 51 through its separating nozzle 133 and enter the separation space 115 of the other separating device 51 through its separating nozzle 133. A separation space connecting gap 143 is provided between the valve element 55 and the separating nozzle 133, particularly between the separating nozzle 133 and the valve element collar 67, wherein the gas flow can flow from the flow space into the bypass space 141 and vise versa through said connecting gap.

The characteristics disclosed in the preceding description, the figures and the claims may be important for realizing the different embodiments of the invention individually, as well as in arbitrary combinations.

The invention claimed is:

1. A device for separating particles from a gas flow, with a blow-by gas of a crankcase ventilation in an internal combustion engine, the device comprising: a valve seat configured to define at least one flow passage opening and through which the gas flow at least partially flows in a main flow direction (H); and a valve element configured to be adjusted relative to the valve seat such that flow guide surfaces of the valve seat and the valve element deflect the gas flow so that particles separate from the gas flow due to the impact of the particles on the flow guide surfaces; wherein the flow guide surfaces of the valve seat and the valve element have at least one turbine blade guide projection or at least one turbine blade guide depression in order to transform the gas flow into a swirling flow.

2. The device according to claim 1, wherein the at least one guide projection or the at least one guide depression has a helical shape, wherein an angular extent of the at least one guide projection and/or the at least one guide depression particularly amounts to at least 30°.

3. The device according to claim 2, wherein an angular acceleration component and/or an axial acceleration component in the main flow direction (H) or a radial acceleration component in a direction extending perpendicular to the main flow direction (H) is imparted upon the gas flow while it flows along the at least one guide projection or the at least one guide depression.

4. The device according to claim 1, characterized in that a separation time for separating the particles from the gas flow by flowing along the at least one guide projection or the at least one guide depression is prolonged by at least 10%.

5. The device according to claim 1, wherein the at least one guide projection or the at least one guide depression comprises an inflow profile lug and an inflow profile rear edge, the connecting line of which defines a profile chord that is oriented askew with respect to the main flow direction (H).

6. The device according to claim 1, further comprising a web, which extends at least partially around the valve seat, deflects the gas flow, so that particles separate from the gas flow due to the impact of the particles on a flow guide surface of the web.

7. The device according to claim 6, wherein the web comprises an edge that faces the valve element, wherein the separated particles can drip off on the edge.

8. The device according to claim 1, wherein the at least one flow guide surface of the valve element has at least one passage hole for the gas flow or at least one abutting contact surface of the valve element or the valve seat is profiled in such a way that a fluid passage is allowed, wherein the at least one guide projection or the at least one guide depression and the at least one passage hole and/or the abutting contact surface profiling are adapted to one another and are arranged relative to one another, in such a way that the at least one guide projection or the at least one guide depression guides the gas flow toward the at least one passage hole or the profiling.

9. The device according to claim 1, wherein the valve seat or the valve element is realized rotationally symmetrical and a group of multiple guide projections or guide depressions is arranged on the respective flow guide surfaces of the valve seat and/or the valve element in a uniformly distributed manner in the rotating direction.

10. The device according to claim 1, wherein the valve element comprises a rotationally symmetrical bowl upstream of the gas flow, wherein a base of the bowl axially protrudes past an axial abutting point between the valve element and the valve seat by at least 10% of the longitudinal extent of the valve element, and wherein the at least one guide projection or the at least one guide depression is arranged on the bowl base and extends away from the bowl base in the main flow direction, such that the at least one passage hole for the gas flow is formed.

11. The device according to claim 1, wherein the at least one guide projection and/or the at least one guide depression is arranged on a shell of the bowl that extends from the bowl base in the main flow direction (H) or on a collar of the bowl that leads into the bowl shell or on a guide pin that extends from the bowl base in the main flow direction (H) and serves for axially guiding the valve element.

12. A particle separator with at least two devices for separating particles from a gas flow, with a blow-by gas of a crankcase ventilation in an internal combustion engine, wherein the at least two devices respectively comprise: a valve seat that defines a flow passage opening and is configured to define at least one flow passage opening and through which the gas flow at least partially flows in a main flow direction (H); and a movable valve element configured to be adjusted relative to the valve seat such that flow guide surfaces of the valve seat and the valve element deflect the gas flow so that particles separate from the gas flow due to the impact of the particles on the flow guide surfaces; wherein the at least two devices particularly are fluidically connected to one another in such a way that a gas flow can flow from one device of the at least two devices into another device of the at least two devices; wherein the flow guide surfaces of the valve seat and the valve element have at least one turbine blade guide projection or at least one turbine blade guide depression in order to transform the gas flow into a swirling flow.

13. A system including the device according to claim 1, further comprising: a crankcase with a flow outlet opening, through which blow-by gas can exit the crankcase; and the device fluidically connected to the flow outlet opening.

14. A system including the particle separator with the at least two devices according to claim 12, further comprising: a crankcase with a flow outlet opening, through which blow-by gas can exit the crankcase: and the at least two devices fluidically connected to the flow outlet opening.

\* \* \* \* \*